United States Patent [19]

Gardner et al.

[11] Patent Number: 5,260,121
[45] Date of Patent: Nov. 9, 1993

[54] FIBER-REINFORCED COMPOSITE OF CYANATE ESTER, EPOXY RESIN AND THERMOPLAST

[75] Inventors: Hugh C. Gardner, Hillsborough; Shahid P. Qureshi, Piscataway, both of N.J.

[73] Assignee: Amoco Corporation, Chicago, Ill.

[21] Appl. No.: 397,987

[22] Filed: Aug. 24, 1989

Related U.S. Application Data

[63] Continuation-in-part of Ser. No. 927,912, Nov. 6, 1986, abandoned.

[51] Int. Cl.$^5$ .................. B32B 17/04; B32B 27/02; B32B 27/04; D03D 15/00
[52] U.S. Cl. ........................ 428/224; 428/245; 428/268; 428/273; 428/367; 428/408; 428/902; 523/445; 523/459; 523/466; 523/468; 523/457; 525/423; 525/438; 525/463; 525/504; 525/523; 525/533
[58] Field of Search .............. 525/438, 420, 423, 463, 525/504, 523, 533; 428/413, 414, 224, 245, 268, 273, 367, 408, 902; 523/445, 459, 457, 466, 468

[56] References Cited

U.S. PATENT DOCUMENTS

| 4,330,658 | 5/1982 | Ikeguchi et al. | 528/73 |
| 4,496,695 | 1/1985 | Sugio et al. | 525/391 |
| 4,528,366 | 7/1985 | Woo et al. | 528/422 |
| 4,645,805 | 2/1987 | Gaku et al. | 525/437 |
| 4,746,727 | 5/1988 | Bogan et al. | 528/425 |

FOREIGN PATENT DOCUMENTS 57-165451 10/1982 Japan.
60-250026 12/1985 Japan.

OTHER PUBLICATIONS

U.S. patent application Ser. No. 314,875, filed on Feb. 24, 1989, applicant, Mitsubishi Denki Kabushiki Kaisha.

Primary Examiner—Robert E. Sellers
Attorney, Agent, or Firm—Richard J. Schlott; Stephen L. Hensley; Frank J. Sroka

[57] ABSTRACT

Matrix resin formulations comprising cyanate esters of phenol adducts of dicyclopentadiene, epoxy resins and particular thermoplastics, provide fiber reinforced composites with excellent toughness and hot/wet properties.

8 Claims, No Drawings

FIBER-REINFORCED COMPOSITE OF CYANATE ESTER, EPOXY RESIN AND THERMOPLAST

CROSS REFERENCE TO RELATED APPLICATIONS

This application is a continuation-in-part of U.S. application Ser. No. 06/927,912, filed Nov. 6, 1986, now abandoned.

FIELD OF THE INVENTION

This invention relates to novel thermoset resins and, more particularly, to thermoset resins comprising polycyanates, epoxy resins and thermoplastics. Still more particularly, this invention relates to compositions comprising particular polymerizable cyanate esters, polymerizable epoxy compounds, and thermoplastics, and to composite materials prepared therefrom. Composites and prepreg materials comprising fibrous reinforcement embedded in the thermoset resin composition exhibit surprising toughness and excellent hot/wet performance.

BACKGROUND OF THE INVENTION

Advanced composites are high strength, high modulus materials which are finding increasing use as structural components in aircraft, automotive and sporting goods applications. Typically, they comprise structural fibers such as carbon fibers in the form of woven cloth or continuous filaments embedded in a thermosetting resin matrix.

Most advanced composites are fabricated from prepreg, a ready-to-mold sheet of reinforcement impregnated with uncured or partially cured resin. For most uses, prepreg must possess a special balance of physical and chemical properties, particularly including the ability to lightly adhere to a metal surface or other plies of prepreg (tack) and the ability to be folded around corners having a radius as small as ¼ in without damage (drape). Tack and drape are particularly important for use in laying up large complex parts such as aircraft wings or fuselages. The reactivity and, hence, the shelf or storage life of prepreg is also important. For example, most aircraft applications require prepreg with low reactivity at room temperature that will retain acceptable tack and drape for at least 10 days, yet be rapidly curable at elevated temperatures (i.e., in 2 to 4 hr at 350°–470° F.).

Resin systems containing an epoxide resin and aromatic amine hardener are often used in prepreg since they possess an appropriate balance of properties. State-of-the-art composites made with these formulations have high compressive strengths, good fatigue characteristics and low shrinkage during cure. However, most epoxy formulations absorb as much as 5 to 6 wt% moisture which causes property deterioration at elevated temperatures and reduces the dimensional stability of cured composites. As a result, they are not suitable for use at 130° C. or greater in a moisture-saturated condition. Since most epoxy formulations used in prepreg are also brittle, the resulting composites have low toughness and poor impact resistance.

Other curable resin systems are known for these applications. For example, in U.S. Pat. No. 3,562,214, resins comprising aromatic cyanic acid esters and polyepoxide compounds are disclosed. The cyanic acid ester and the epoxide compound are generally heated together to provide a homogeneous liquid which can be cast into molds. Also disclosed is the use of solutions of these components in a solvent such as acetone, methyl ethyl ketone and the like, for impregnating webs of paper or fabric which can be employed in making laminates.

Also useful are the compositions described in U.S. Pat. No. 4,110,364 that comprise a cyanate ester, a bismaleimide, and, optionally, an epoxy compound; and the compositions described in U.S. Pat. No. 4,157,360, which include a cross-linked cyanate polymer and a thermoplastic polymer. The latter compositions may be prepared from a solution of the thermoplastic polymer and aromatic dicyanate monomer by removing the solvent, then curing the resulting intimate mixture by heating at a temperature above about 200° C. The compositions may also be prepared from a melt containing the polymer and monomer by heating at 200° C. or higher to yield a partially cured or cured composition. These compositions, typically containing equal parts by weight of the thermoplastic polymer and the cyanate monomer, do not possess the appropriate tack and drape required generally for many prepreg applications.

A curable composition comprising a polyphenylene ether resin, a bismaleimide and/or a cyanate ester and an epoxy compound is disclosed in U.S. Pat. No. 4,496,695, together with copper-clad laminates comprising such formulations reinforced with glass fabric. However, since polyphenylene ethers are high temperature, high melt-viscosity resins and are insoluble in these liquid components, the compositions can only be prepared by first dissolving the components in a suitable solvent.

Although formulations based on bismaleimides and epoxy resins are thus known, improved formulations useful in producing fiber-reinforced composites having good toughness and the ability to retain stiffness properties after exposure to hot/wet conditions are needed.

SUMMARY OF THE INVENTION

This invention relates to novel thermoset matrix resin formulations and fiber-reinforced composites comprising such formulations. More particularly, the present invention is directed to a solvent-free, curable matrix resin formulation comprising particular polymerizable cyanate esters, polymerizable epoxy compounds and particular thermoplastics, as well as to fiber-reinforced composites formed from said curable formulations. The curable formulations may be further compounded with cure accelerators, fillers and fibrous reinforcement.

Unreinforced castings made from curable formulations of this invention generally exhibit lower tensile properties and reduced stiffness compared with those commonly exhibited by more conventional cyanate esters. It is therefore surprising that cured composites comprising the formulations of this invention exhibit equivalent toughness, together with improved hot/wet properties, which make them especially suitable for use in the production of tough, high-performance, fiber-reinforced composites. Composites comprising the thermoset matrix resin formulations of this invention exhibit an excellent balance of toughness and hot/wet properties. Prepreg comprising these formulations, before curing, possesses excellent and highly useful processability, drapability and tack characteristics.

DETAILED DESCRIPTION OF THE INVENTION

The curable matrix resin formulations useful in the practice of this invention comprise particular cyanate esters, epoxy resins and particular thermoplastics.

The cyanate ester component is a polymerizable aromatic cyanate ester compound having a plurality of cyanate ester groups per molecule, which may be further described as the cyanate ester of a polyphenol, including polymeric and oligomeric derivatives of diphenols and bisphenols. Also included are polycyanates comprising aromatic radicals bridged by cycloalkylene groups and the like, as well as cyanate esters of novolak-type phenolic resins.

Cyanate esters useful in the practice of this invention may include, for example, cyanated novolak; cyanated bisphenol-terminated polycarbonate or other thermoplastic oligomer; and mixtures thereof. Also included are cyanates of poly(alkenyl phenols) disclosed in U.S. Pat. No. 4,477,629, cyanates from bisphenols of dicyclopentadiene which are disclosed in, for example, U.S. Pat. No. 4,528,366, the disclosure of which is incorporated herein by reference, and the cyanates disclosed in British Patent No. 1,305,702. Preferred are the cyanate esters of polycyclic bridged, hydroxy-substituted polyaromatic compounds, including the cyanates of bisphenols of dicyclopentadiene, described in U.S. Pat. No. 4,528,366. These and a wide variety of other cyanate esters are widely known in the art and many are commercially available.

Epoxy resins useful in the practice of this invention include any of the great variety of polyfunctional epoxy resins widely known and readily available from commercial sources. Among these are the polyglycidyl derivatives of phenolic compounds, such as those available commercially under the trade names such as Epon 828, Epon 1001, Epon 1009 and Epon 1031 from Shell Chemical Co.; DER 331, DER 332, DER 334 and DER 542 from Dow Chemical Co.; and BREN-S from Nippon Kayaku, Japan. Other suitable epoxy resins include polyepoxides prepared from polyols and the like and polyglycidyl derivatives of phenol-formaldehyde novolaks. The latter are commercially available as DEN 431, DEN 438 and DEN 439 from Dow Chemical Company, while cresol analogs are available as ECN 1235, ECN 1273 and ECN 1299 from Ciba-Geigy Corporation. SU-8 is a bis-A based resin from Interez, Inc. Polyglycidyl adducts of amines, aminoalcohols and polycarboxylic acids are also useful in the practice of this invention. Commercially available resins of this type include Glyamine 135, Glyamine 125 and Glyamine 115 from F.I.C. Corporation; Araldite MY-720, Araldite MY-0500 and Araldite MY-0510 from Ciba-Geigy Corporation; and PGA-X and PGA-C from The Sherwin-Williams Co.

Also suitable are epoxy-terminated thermoplastic polymers such as the epoxy-terminated polysulfones disclosed in U.S. Pat. No. 4,448,948.

The second group of epoxy resins useful in the practice of this invention are those prepared by epoxidizing dienes or epoxycyclopentyl) ether and the reaction products thereof with ethylene glycol, described in U.S. Pat. No. 3,398,102. Commercial examples of these epoxides include vinylcyclohexene dioxide, 3,4-epoxycyclohexylmethyl-3,4-epoxycyclohexane carboxylate, 3,4-epoxy-6-methylcyclohexylmethyl-3,4-epoxy-6-methylcyclohexane carboxylate, bis(3,4-epoxy-6-methylcyclohexylmethyl) adipate, dipentene dioxide and 2-(3,4-epoxycyclohexyl-5,5-spiro-3,4-epoxy)cyclohexanemetadioxane, as well as epoxidized polybutadiene obtainable as Oxiron 2001 from FMC Corp.

Other epoxy resins not specifically described above may also be used as modifiers in the resin formulations of the present invention.

The preferred epoxy resins are bisphenol A epoxy resins, epoxy-novolak resins, 1,1,2,2-tetrakis (4-hydroxyphenyl) ethane, the diglycidyl ethers of bisphenols such as bisphenol F, bisphenol S (4,4'-dihydroxy diphenyl sulfone), and tetrabromobisphenol A, and BREN-S.

In the compositions of this invention, the cyanate ester and the epoxy resin will be present in amounts based on the ratio between the cyanate (—OCN) groups and the epoxy groups. Generally, the ratio of cyanate groups to epoxy groups will lie in the range of from 1:1 to 100:1 and, more preferably, from 1.5:1 to 50:1.

Compositions of this invention will also include a thermoplastic polymer which is miscible with the cyanate ester and the epoxy resin components of the curable composition. The thermoplastic polymers which may be used in this invention will have a glass transition temperature above about 150° C., and may, for example, include polyarylethers such as those described in U.S. Pat. Nos. 4,108,837, 4,175,175 and 4,332,209. Also suitable are polycarbonates, polyetherimides, the poly(amide-imide) thermoplastics and polyarylates, as well as mixtures thereof.

The preferred thermoplastics include UDEL® P-1800 polysulfone and ARDEL® D-100 polyarylate (available from Amoco Performance Products, Inc.), Lexan-105 polycarbonate, Lexan-3250 polyestercarbonate, ULTEM-1000 polyetherimide (available from General Electric Co.) and Victrex P-200 (available from Imperial Chemical Industries), as well as Radel R® polysulfone (available from Amoco Performance Products, Inc.). The compositions of the aforesaid thermoplastics are well known and are described and set forth in the published art.

The resin formulations of this invention will comprise from 50 to 98 wt%, preferably from 60 to 90 wt%, of the cyanate ester component; from 1 to 45 wt%, preferably about 5 to 32 wt% of the epoxy resin; and from 1 to 20 wt%, preferably from 1.5 to 14 wt% of the thermoplastic, based on total of these components.

The composition of this invention may further comprise additional polymerizable components including a bismaleimide. The bismaleimides that may be used in the present invention, either as polymerizable components or in combination with cyanates in the form of BT resins are the bismaleimides of aromatic diamines, and are prepared generally from maleic anhydride and the corresponding aromatic diamines.

The preferred bismaleimides are derived from aromatic diamines and most preferred are those derived from polynuclear aromatic diamines. Examples of such bismaleimides include 2,2-bis(4-aminophenoxy-4-phenyl) propane bismaleimide, 4,4'-bis(3-aminophenoxy) diphenyl sulfone bismaleimide, 1,4-bis(3-aminophenyl isopropylidene) benzene bismaleimide and bis(4-aminophenyl) methane bismaleimide. The bismaleimides may be used singly or as mixtures.

Cure accelerators may also be used in the practice of this invention to facilitate cyanate trimerization and/or epoxy/cyanate coreaction. The cure accelerators and catalysts are those conventionally used for these purposes, and may include phenols, tertiary amines, alcohols, salts such as LiCl, and soluble transition metal complexes such as zinc octoate, copper acetylacetonate, cobalt naphthenate and the lide. U.S. Pat. Nos. 3,694,410 and 4,528,366 describe several such catalysts and levels for their effective use.

When the compositions comprise bismaleimides, peroxide cure accelerators such as dicumyl peroxide, di-t-butyl peroxide, t-butyl perbenzoate and 1,1-bis(t-butylperoxy) cyclohexane may also be included. Free radical inhibitors such as phenothiazine or benzoquinone are frequently employed in the resin art to increase storage stability, and these compounds may also be included in the compositions of this invention.

These components may be added to the composition at any desired level. Cure accelerators, when employed, will be present in an amount of from about 0.001 to 5 wt%, preferable about 0.01 to 2 wt%, again based on total composition. The peroxides are conventionally used at levels of 0.01 to 1 pbw per 10 parts of bismaleimide in a formulation.

The compositions of this invention will most often be employed in combination with fiber reinforcement in the preparation of structural composites. The structural fibers which may be used in preparing such composites include carbon, graphite, glass, silicon carbide, poly(benzothiazole), poly(benzimidazole), poly(benzoxazole), alumina, titania, boron and aromatic polyamide fibers. These fibers are characterized by a tensile strength of greater than 100,000 psi, a tensile modulus of greater than two million psi and a decomposition temperature of greater than 200° C. The fibers may be used in the form of continuous tows (1000 to 400,000 filaments each), woven cloth, whiskers, chopped fiber or random mat. The preferred fibers are carbon fibers, aromatic polyamide fibers such as Kevlar 49 fiber (obtained from E.I. DuPont de Nemours, Inc.), silicon carbide fibers and glass fibers. Composites generally comprise about 20 to about 80% by weight of structural fiber, preferably between 30 and 75% by weight.

The structural fiber will ordinarily be combined with the curable resin compositions of this invention to provide preimpregnated reinforcement or prepreg. Prepreg may be prepared by any of the several techniques well known and commonly used in the art. For example, the resin may be first coated as a thin film on release paper. Aligned tows of carbon fiber are then pressed between two sheets of the coated paper and passed through a series of heated rollers to effect wet-out of the fiber tows by the resin. The resulting prepreg is then allowed to cool and is taken up on a spool. Tacky, drapable prepreg can be obtained with the curable compositions of this invention having a long shelf life, typically four to six weeks.

Composites may be prepared from the prepreg by curing with heat, optionally under pressure. Composites may also be prepared from the curable compositions of this invention via wet lay-up followed by compression molding, by transfer molding, or by resin injection, as described in European Patent Application 0019149, published Nov. 26, 1980. Composites employing the compositions of this invention may also be fabricated in a filament-winding operation, wherein preimpregnated tow is wound over a rotating and removable form or mandrel and cured in an oven or autoclave.

In addition to structural fibers, the composition may also contain particulate fillers such as talc, mica, calcium carbonate, aluminum trihydrate, glass microballoons, phenolic thermospheres and carbon black, as well as thixotropic additives such as fumed silica. Up to half of the weight of structural fiber in the composition may be replaced by one or more of such fillers.

EXAMPLES

The practice of this invention will be better understood by consideration of the following examples. These examples are provided as specific illustrations of the practice of this invention and are not intended to be in any way limiting of the scope of this invention.

EXAMPLE 1

A 3L flask equipped with a paddle stirrer, thermometer, temperature controller, an inlet and outlet for inert gas and an electric heating mantle was charged with 500 g of powdered polyetherimide, obtained as Ultem ® 1000 polyetherimide from General Electric Company, and 1500 g of Bisphenol F diglycidylether, obtained as Epiclon ® 830 from Dainippon Ink. The mixture was heated and stirred for 45 min at 160° C. At the end of this period the polyetherimide dissolved. A portion (300 g) of the blend was charged in a 2L flask and then 700 g of the cyanate of phenol adduct of dicyclopentadiene, i.e. the bisphenol of dicyclopentadiene—a cyanate ester of a polycyclic bridged, hydroxy-substituted polyaromatic compound obtained from Dow Chemical Company as XU-71787, was added. The mixture was heated and stirred for 1 hr at 140° C., then discharged into pans for cooling and storage. A thin film of the resin was cast on silicone—coated on release paper and used to make a unidirectional prepreg tape with polyacrylonitrile-based carbon fiber (THORNEL ® T650/35, from Amoco Performance Products, Inc.; typical characteristics are 650 kpsi tensile strength; 35 mpsi Young's modulus; 1.78 g/cc density and 12,000 filaments per tow). The finished prepreg tape contained approximately 34 wt% resin, had a fiber areal weight of 146 g/m$^2$ and was 12 in wide.

A ten-ply laminate (6 in × 12 in) with a ply orientation of [(+30)$_2$,90]$_s$ was laid up with this prepreg and cured in an autoclave as follows:
Heat from 75° F. to 266° F. at 3° F./min.
Hold for 1 hr at 266° F.
Heat from 266° F. to 350° F. at 3° F./min.
Hold for 4 hr at 350° F.
Cool from 350° F. to 77° F. at 3° F./min.

The laminate was post-cured in a forced air oven for 4 hr at 445° F. Five 1 in × 10 in test specimens cut from the laminate were tested to determine the edge delamination strength (EDS).

Control A

The procedure of Example 1 was followed to provide a further quantity of polyetherimide/epoxy mixture; 300 g of the Ultem/Epi830 blend were then charged in a 2L flask, followed by 700 g of RDX 80352 Bisphenol A dicyanate, from Hi-Tek Polymers. The mixture was heated and stirred for 1 hr at 40° C. A unidirectional prepreg tape was made by the procedures of Example 1. The final prepreg, with a fiber areal weight of 146 g/m$^2$, a resin content of approximately 34% by weight and a width of 12 in, was formed into a laminate for testing, as in Example 1.

Testing Procedures

Composite specimens were evaluated for edge delamination strength (EDS) and hot/wet performance. The EDS test has been implemented in the aerospace industry to assess the toughness of composites. The test procedure followed was that set forth in *SAMPE Journal*, Vol. 18, No. 4, July/August 1982, p. 8.

To determine hot/wet performance of composites, the prepreg tape was laid into an 8-ply, 6 in×12 in laminate with a (+45)$_{2s}$ configuration. The laminate was cured and post cured as above and then cut into 1 in×10 in strips to measure high temperature property retention in the wet condition. The strips were immersed in water at 160° F. for two weeks and then placed in an Instron testing machine to determine stiffness. The stiffness in tension of the moisture-conditioned specimen was determined at room temperature and at 325° F after heating the specimen at that temperature in less than 1 min.

Unreinforced castings of the resin of Example 1 and of the resin of Control A were prepared by degassing the molten resin in a vacuum oven at 130° C. for about 10 min, then pouring the degassed resin into a glass mold having a ⅛ in×8 in×10 in cavity and heating the casting as follows:

75° F. →350° F., 3° F./min; hold 4 hr;
350° F. →445° F., 3° F./min; hold 4 hr;
cool at 10° F./min.

Type 1 dogbone specimens were cut from the casting for testing.

The properties of the composite and unreinforced casting specimens of Example 1 and of Control A are summarized in Table I.

TABLE I

| Example: | 1 | A |
| --- | --- | --- |
| Components | | |
| Cyanate (wt %) | 70.0 | 70.0 |
| Epoxy Resin (wt %) | 22.5 | 22.5 |
| Polyetherimide (wt %) | 7.5 | 7.5 |
| Casting Properties | | |
| Tensile strength (kpsi) | 6.7 | 9.8 |
| Tensile modulus (kpsi) | 406 | 436 |
| Elongation (%) | 1.7 | 2.7 |
| Composite Properties | | |
| EDS (kpsi) | 32.6 | 32.1 |
| Mod. Rtn. @ 325° F., wet (%) | 54.0 | 32.6 |

Notes
Tensile properties measured according to ASTM D-638; EDS = Edge Delamination Strength; Mod. Rtn. = retention of room temperature stiffness at 325° F., after immersion in water two weeks @ 160° F.; see text. Polyetherimide = Ultem 1000 polyetherimide, obtained from General Electric Co.

It will be apparent from a consideration of the properties of Example 1 in comparison with those of Control A that resin formulations of this invention, when cast and cured without reinforcement, exhibit tensile properties somewhat lower than comparable formulations based on a conventional bis-cyanate resin. It will also be noted that the EDS characteristics of the composites of this invention are little changed from those of the control composite based on the more conventional cyanate formulation.

Fiber-reinforced composites prepared from these formulations exhibit significantly improved hot/wet properties, and particularly an improved ability to retain stiffness at elevated temperatures after water soak. It is thus highly surprising and unexpected that the fiber-reinforced composites based on such resin formulations exhibit toughness equivalent with composites based on more conventional cyanate resin formulations, as shown in Table I.

This invention will thus be seen to be a homogeneous, solvent-free, curable matrix resin formulation comprising a polymerizable cyanate ester, preferably a cyanate ester of polycyclic bridged hydroxy-substituted polyaromatic compounds such as a bisphenol of dicyclopentadiene, a polymerizable epoxy resin, and a thermoplastic, and fiber-reinforced composites comprising such formulations. The matrix resin formulation may further comprise one or more additional polymerizable curable components, including bismaleimides, and may include cure accelerators, fillers, fiber reinforcement, heat and light stabilizers, pigments, dyes and the like. The compositions of this invention may be used as matrix resins for composites, as high temperature coatings and as adhesives, while the fiber-reinforced composites may be suitable for use as fairings, floor panels, flaps drive shafts, bumpers and springs and in the construction of pressure vessels, tanks and pipes. They may also be suitable for sporting goods applications such as golf club shafts, tennis rackets and fishing rods. Further additions and modifications may also be made without departing from the spirit and scope of the invention, which is defined by the appended claims.

We claim:

1. A fiber-reinforced composite comprising from about 20 to about 80 wt%, based on composite weight, of continuous carbon fiber embedded in a cured matrix resin, said matrix resin comprising from about 50 to about 98 wt% of a cyanate ester of a polycyclic bridged, hydroxy-substituted polyaromatic compound; from about 1 to about 45 wt% of an epoxy resin; and from about 1 to about 20 wt% of a thermoplastic polymer which is a polyetherimide.

2. The composite of claim 1, wherein the cyanate ester is a cyanate ester of a bisphenol of dicyclopentadiene.

3. The composite of claim 1, wherein the matrix resin comprises from about 60 to about 90 wt% of said cyanate ester.

4. The composite of claim 1, wherein the matrix resin comprises from about 5 to about 32 wt% of said epoxy resin.

5. The composite of claim wherein said epoxy resin is the diglycidyl ether of a bisphenol.

6. A fiber-reinforced composite comprising from about 20 to about 80 wt.%, based on composite weight, of continuous carbon fiber embedded in a cured matrix resin, said matrix resin comprising from about 60 to about 90% wt% of a cyanate ester of a bisphenol of dicyclopentadiene; from about 5 to about 32 wt.% of a diglycidyl ether of a bisphenol; and from about 1 to about 20 wt.% of a thermoplatic polymer which is a polyetherimide.

7. The composite of claim 6, wherein the diglycidyl ether of a bisphenol is a diglycidyl ether of Bisphenol F.

8. The composite of claim 6 comprising form 30 to 75 wt.% said continuous carbon fiber.

* * * * *